United States Patent
Komine et al.

(10) Patent No.: US 7,522,362 B2
(45) Date of Patent: Apr. 21, 2009

(54) AMPLITUDE SERVO PATTERN, MAGNETIC RECORDING MEDIUM AND THE MANUFACTURING METHOD, PATTERNED MAGNETIC TRANSFER MASTER SUBSTRATE USED IN THE MANUFACTURING METHOD, AND MAGNETIC RECORDING/REPRODUCING APPARATUS

(75) Inventors: Takashi Komine, Hitachi (JP); Ryuji Sugita, Hitachi (JP); Tadashi Yasunaga, Odawara (JP); Makoto Nagao, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 148 days.

(21) Appl. No.: 11/185,684

(22) Filed: Jul. 21, 2005

(65) Prior Publication Data

US 2006/0007569 A1 Jan. 12, 2006

(30) Foreign Application Priority Data

Jul. 21, 2004 (JP) ............................ 2004-213027

(51) Int. Cl.
*G11B 5/09* (2006.01)
*G11B 5/86* (2006.01)

(52) U.S. Cl. .......................... 360/48; 360/17
(58) Field of Classification Search ............... 360/17
See application file for complete search history.

(56) References Cited

U.S. PATENT DOCUMENTS 5,402,278 A 3/1995 Morita

| | | | |
|---|---|---|---|
| 5,923,492 A * | 7/1999 | Liikanen | 360/77.08 |
| 6,243,223 B1 | 6/2001 | Elliott et al. | |
| 6,433,950 B1 | 8/2002 | Liikanen | |
| 6,909,563 B2 | 6/2005 | Nishikawa et al. | |
| 7,149,042 B2 | 12/2006 | Nishikawa et al. | |
| 2003/0053261 A1 | 3/2003 | Thia | |
| 2003/0063403 A1* | 4/2003 | Nishikawa et al. | 360/17 |
| 2004/0252394 A1 | 12/2004 | Hamaguchi et al. | |

FOREIGN PATENT DOCUMENTS

| | | |
|---|---|---|
| EP | 1256940 A | 11/2002 |
| JP | 5-074076 A | 3/1993 |
| JP | 10-40544 A | 2/1998 |
| JP | 10-269566 A | 10/1998 |
| JP | 2003-173516 A | 6/2003 |
| JP | 2005-004917 A | 1/2005 |

OTHER PUBLICATIONS

Zhu et al, Recording, Noise, and Servo Characteristics of Patterned Thin Film Media, Jan. 2000, IEEE Transactions on Magnetics, vol. 36, No. 1, pp. 23-29.*

* cited by examiner

*Primary Examiner*—Jason C Olson
(74) *Attorney, Agent, or Firm*—Sughrue Mion, PLLC

(57) ABSTRACT

An amplitude servo pattern capable of providing accurate servo control through reproduced amplitude with reduced noise is provided. The amplitude servo pattern has servo burst signals composed of burst bit strings adjacently disposed in a track width direction. The burst bit strings are disposed such that the servo burst signals adjacently disposed in the track width direction have a phase difference with each other in a track direction.

12 Claims, 5 Drawing Sheets

AMPLITUDE SERVO PATTERN, MAGNETIC RECORDING MEDIUM AND THE MANUFACTURING METHOD, PATTERNED MAGNETIC TRANSFER MASTER SUBSTRATE USED IN THE MANUFACTURING METHOD, AND MAGNETIC RECORDING/REPRODUCING APPARATUS

BACKGROUND OF THE INVENTION

1. Field of the Invention

The present invention relates to an amplitude servo pattern, a magnetic recording medium and the manufacturing method. More specifically, the present invention is directed to an amplitude servo pattern having amplitude reproducing servo signals, a magnetic recording medium having thereon a magnetized bit pattern corresponding to the amplitude servo pattern, and a manufacturing method for manufacturing the magnetic recording medium.

The present invention also relates to a patterned magnetic transfer master substrate for use in the manufacturing method for manufacturing the magnetic recording medium.

Further, the present invention is directed to a magnetic recording/reproducing apparatus that uses the magnetic recording medium having thereon the magnetized bit pattern corresponding to the amplitude reproducing servo signals.

2. Description of the Related Art

Generally, in the field of magnetic recording media, inexpensive media with a larger capacity for storing information have been preferred, with increasing amount of information. At the same time, the media are preferable to allow the so-called fast access for reading out required data in a short time. Consequently, various types of high density magnetic recording media are known. The high density magnetic recording media have the information recording region formed of narrow tracks. In order for the magnetic head to accurately scan over the narrow tracks to reproduce a signal of high S/N (signal-to-noise) ratio, the so-called tracking servo technology plays an important role. For the tracking servo, the sector servo technology is widely used.

The sector servo technology employs servo fields arranged regularly at predetermined angles on the data surface of a magnetic recording medium, such as a magnetic disk or the like. The servo field contains servo information including a servo signal for tracking, track address signal, reproducing clock signal, and the like, and the reproducing magnetic head scans over the servo field to read out the servo information for confirming or correcting its position.

Generally, reproduced amplitude information of the servo signal is used as the tracking servo signal. In a general servo pattern, the servo signal comprises A, B, C and D bursts, and respective bits in the A and B burst bit strings forming A and B bursts respectively are arranged away from each other by ½ track width from the center of the track. When the reproducing magnetic head passes over the servo fields, tracking servo is applied to the head such that the amplitude reproduced by A and B burst bit strings becomes equal to each other.

The servo information needs to be prerecorded on a magnetic recording medium as a preformat when the medium is manufactured. Currently, the preformatting is implemented using a dedicated servo recording device. The servo recording device currently used has a magnetic head with the width, for example, of 75% of the track pitch. Servo signals are recorded by rotating the disk with the head placing close to the disk, and moving the head by ½ track from the outer to inner circumferences. Consequently, the preformatting of a single disk requires a long time, posing a problem from the stand point of production efficiency.

In the mean time, a method for transferring a pattern carrying servo information formed on a master substrate to a magnetic recording medium through magnetic transfer is proposed as described, for example, in Japanese Unexamined Patent Publication Nos. 10 (1998)-040544 and 10(1998)-269566.

The method uses a patterned master substrate having a transfer pattern, which comprises an irregular pattern corresponding to the information to be transferred to a magnetic recording medium (slave medium), such as a magnetic disk or the like. In transferring the information from the master substrate to a magnetic recording medium, the substrate and the medium are placed together in close contact with each other and a transferring magnetic field is applied, thereby a magnetized pattern corresponding to the irregular pattern of the master substrate is magnetically transferred to the magnetic recording medium. The method affords the advantage that it allows the static information transfer without changing the relative positions between the master substrate and magnetic recording medium, that is, it allows accurate preformatting of the magnetic recording medium within an extremely shorter time.

The amplitude servo pattern described above has a servo burst signal composed of burst bit strings disposed on different tracks and arranged adjacently in a track width direction with spacing of approximately 1 track pitch as illustrated in Japanese Unexamined Patent Publication Nos. 10(1998)-040544 and 10(1998)-269566. The adjacently disposed burst bit strings are formed to have the same phase, and a non-signal region of approximately 1 track pitch is present between them. When such a servo pattern is recorded on a magnetic recording medium through magnetic transfer, magnetization that causes a noise problem occurs in the non-signal region.

Figure 5:
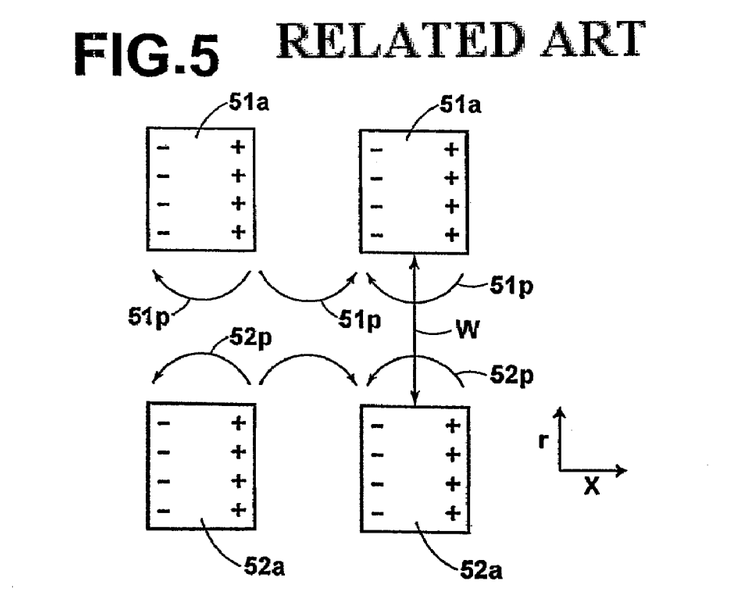
FIG. 5 is an explanatory diagram illustrating characteristics of the servo pattern on a typical conventional patterned master substrate when a magnetic field is applied thereto.

The phenomenon described above will be described with reference to FIG. 5. The servo burst signal shown in the drawing is a partial enlarged view of a pattern formed on a patterned magnetic transfer master substrate. The servo burst signals comprise an irregular transfer pattern of a magnetic material, which is placed together with a magnetic recording medium in close contact, and a transferring magnetic field is applied so that a magnetized pattern that corresponds to the irregular pattern is recorded on the magnetic medium. A burst bit string arranged on the first track has a plurality of burst bit elements. But, here in FIG. 5, only two elements 51a, 51a are shown for clarity, which are disposed in the track direction x with spacing corresponding to the width of the element in the track direction. On the second track, two burst bit elements 52a, 52a are adjacently disposed in the track width direction r such that they have the same phase as the elements 51a, 51a respectively with a spacing of approximately one track (hereinafter, this spacing is referred to as the "intermediate track" for convenience). When an external magnetic field for the magnetic transfer is applied, the edges of each of the burst bit elements 51a, 51a, 52a and 52a are positively and negatively polarized respectively as shown in FIG. 5.

Figure 6:
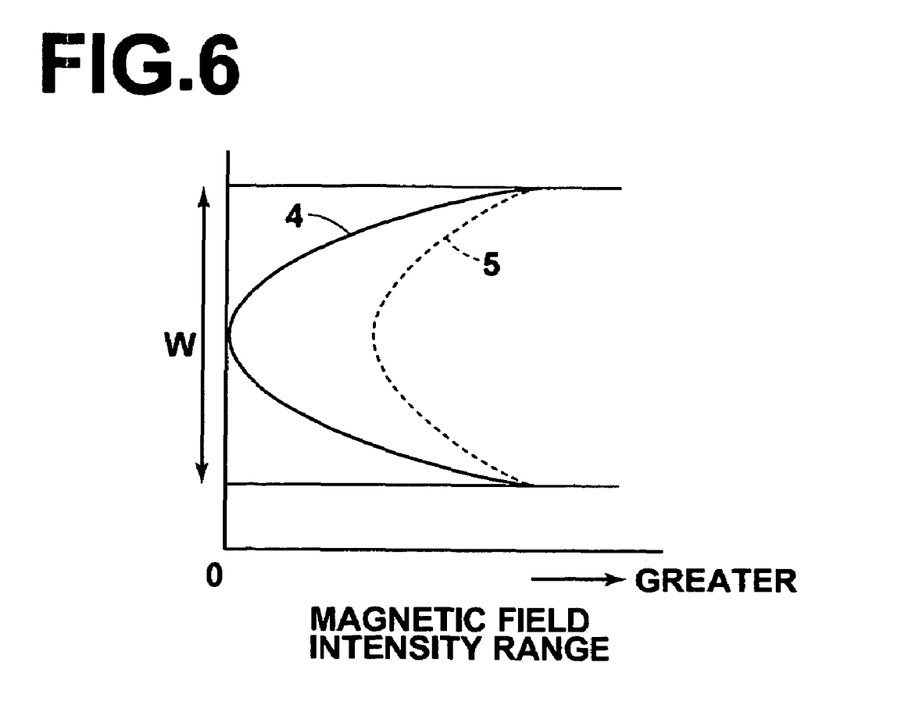
FIG. 6 is a drawing illustrating the intensity range of magnetic field developed in accordance with the phase difference between the burst bit strings.

Thus, magnetic fields having the same phase are present on the intermediate track. That is, those shown by arc shaped arrows 51p erupted from the burst bit elements 51a, 51a on the first track, and those shown by arc shaped arrows 52p erupted from the burst bit elements 52a, 52a are present on the second track. Consequently, the magnetic field intensity range in the width direction of the intermediate track indicated by a double head arrow W becomes like that as shown by the dashed line 5 in FIG. 6, which is directly transferred to the magnetic recording medium. The referent of the "magnetic field intensity range" as used herein means the magnitude of the change in the magnetic field intensity in a track direction at a particular point in the width of the intermediate track between the two adjacent burst signals in a track width direction (for example, the width indicated by the double head arrow W in FIG. 5). Accordingly, when the intermediate track between the first burst bit string and second burst bit string recorded on the magnetic recording medium is scanned by the magnetic head, the magnetic field indicated by the dashed line 5 in FIG. 6 is detected as the noise, causing degraded capability of the magnetic head for accurate tracking.

Today, in particular, in the trend toward an increasingly large capacity for magnetic disk media, efforts have been made for a narrower track width, and a magnetic disk medium with a track pitch of, for example, around or less than 200 nm is within the reach of reality. A narrower track pitch means smaller amplitude reproduced by each of the burst bit strings, and the tracking accuracy may be affected significantly by the noise described above.

SUMMARY OF THE INVENTION

The present invention has been developed in view of the circumstances described above, and it is an object of the present invention to provide an amplitude servo pattern capable of providing accurate servo control through reproduced amplitude, a magnetic recording medium having thereon such an amplitude servo pattern and a manufacturing method for manufacturing such a magnetic recording medium, and a magnetic recording/reproducing apparatus that uses such a magnetic recording medium.

It is a further object of the present invention to provide a patterned magnetic transfer master substrate for use in the manufacturing method for manufacturing such a magnetic recording medium.

The amplitude servo pattern of the present invention has servo burst signals composed of burst bit strings adjacently disposed in a track width direction, wherein the servo burst signals adjacently disposed in the track width direction have different phases with each other in a track direction.

Preferably, the servo burst signals disposed in the track width direction have a phase difference in the range from 90 to 180 degrees with each other.

Preferably, the ratio of the length in the track width direction to the track direction of each bit in the burst bit strings is not greater than 2.

Preferably, each servo burst signal has rounded edges in the track width direction.

The magnetic recording medium of the present invention has the amplitude servo pattern of the present invention recorded on the magnetic recording layer of the medium through magnetic transfer.

The manufacturing method of the present invention for manufacturing the preformatted magnetic recording medium of the present invention comprises the steps of:

placing the surface of a patterned magnetic transfer master substrate and a magnetic recording surface of a magnetic recording medium together in close contact with each other, the master substrate having thereon an amplitude servo transfer pattern that comprises servo burst signals composed of burst bit element strings adjacently disposed in a track width direction, and the servo burst signals adjacently disposed in the track width direction having different phases with each other in a track direction; and applying a magnetic field to the closely contacted patterned magnetic transfer master substrate and magnetic recording medium to magnetically transfer the amplitude servo transfer pattern to the recording surface of the magnetic recording medium.

The burst bits magnetically transferred to the magnetic recording medium correspond one-to-one to the burst bit elements on the master substrate. Likewise, the burst bit strings on the magnetic recording medium correspond to the element strings on the master substrate.

The patterned magnetic transfer master substrate of the present invention has thereon an amplitude servo transfer pattern that comprises servo burst signals composed of burst bit strings adjacently disposed in a track width direction, the servo burst signals adjacently disposed in the track width direction having different phases with each other in a track direction.

The burst bit string in the amplitude servo pattern recorded on the magnetic recording medium may comprise a single or a plurality of burst bits. When the string comprises a plurality of burst bits, these burst bits are recorded such that the length of each bit in the track width direction becomes equal to each other, and the edge position of each bit in the track width direction is aligned with each other. Likewise, the burst bit element string formed on the surface of the patterned magnetic transfer master substrate may comprise a single or a plurality of burst bit elements. When the string comprises a plurality of burst bit elements, these bit elements are formed such that the surface length of each bit element in the track width direction becomes equal to each other, and the edge position of each bit element in the track width direction is aligned with each other.

The magnetic recording/reproducing apparatus of the present invention comprises:
  a magnetic head;
  a preformatted magnetic recording medium disposed opposite to the magnetic head;
  a means for driving the magnetic head;
  a means for driving the magnetic medium; and
  a recording/reproduced signal processing means for processing signals before sending to or after receiving from the magnetic head,
  wherein the preformat of the magnetic medium includes an amplitude servo pattern that comprises servo burst signals composed of burst bit strings adjacently disposed in a track width direction, and the servo burst signals adjacently disposed in the track width direction have different phases with each other in a track direction.

The preformatted magnetic recording medium is designed to be installed at a place where read/write operation by the magnetic head of the magnetic recording/reproducing apparatus is enabled, and may be installed fixedly at the place or detachable at times other than during the read/write operation.

The amplitude servo pattern of the present invention has servo burst signals composed of burst bit strings adjacently disposed in a track width direction, and the servo burst signals adjacently disposed in the track width direction have different phases with each other in a track direction. This arrangement may reduce the amount of magnetic fields erupted to the non-signal region between the servo burst signals adjacently disposed in the track width direction when a transferring magnetic field or the like is applied, so that an accurate tracking may be performed based on the detected burst signals.

The magnetic recording medium of the present invention has a servo pattern recorded thereon, which includes adjacently disposed servo burst signals in a track width direction having different phases in a track direction with each other. This arrangement may reduce the amount of noise signal magnetically recorded on the non-signal region between the servo burst signals adjacently disposed in the track width direction, and hence the amount of noise detected by the magnetic head at the time of scanning, so that the accuracy of the tracking servo may be maintained.

Further, for a magnetic medium having a narrow track of less than 200 nm, in particular, the reduced output and degradation of S/N ratio have been a problem. The magnetic recording medium of the present invention may reduce the noise ratio and may readily control the tracking servo based on the reproduced amplitude servo signal.

The manufacturing method of the present invention for manufacturing the magnetic recording medium of the present invention is a method in which an amplitude servo pattern that comprises adjacently disposed burst bits in the track width direction having different phases with each other in a track direction is recorded on the magnetic recording medium through magnetic transfer using the patterned magnetic transfer master substrate. Thus, the method may provide satisfactory bit recording on the medium that reduces the amount of noise that may affect the reading of the reproduced amplitude servo signals.

The patterned magnetic transfer master substrate of the present invention has thereon an amplitude servo transfer pattern that comprises adjacently disposed servo burst signals in a track width direction having different phases with each other in a track direction. Thus, the magnetic recording medium of the present invention may readily be manufactured by using the master substrate.

If the phase difference between the servo burst signals adjacently disposed in a track width direction in the amplitude servo pattern is in the range from 90 to 180 degrees, the amount of noise detected by the magnetic head is satisfactorily small. In particular, if it is 180 degrees, the amount of noise detected is minimized.

Further, when the length of the burst bit in a track direction recorded on the disk differs between the outer and inner circumferences, the noise between the adjacently disposed burst bit strings on the outer circumference where each burst bit has a longer length in the track direction is liable to become greater. The noise reduction effect obtainable by the phase shifting between the burst bit strings described above becomes more significant in the region where the ratio of the length in a track width direction to a track direction of each bit in the bit strings is not greater than 2.

DESCRIPTION OF THE PREFERRED EMBODIMENTS

Hereinafter, embodiments of the present invention will be described in detail with reference to the accompanying drawings.

Figure 1:
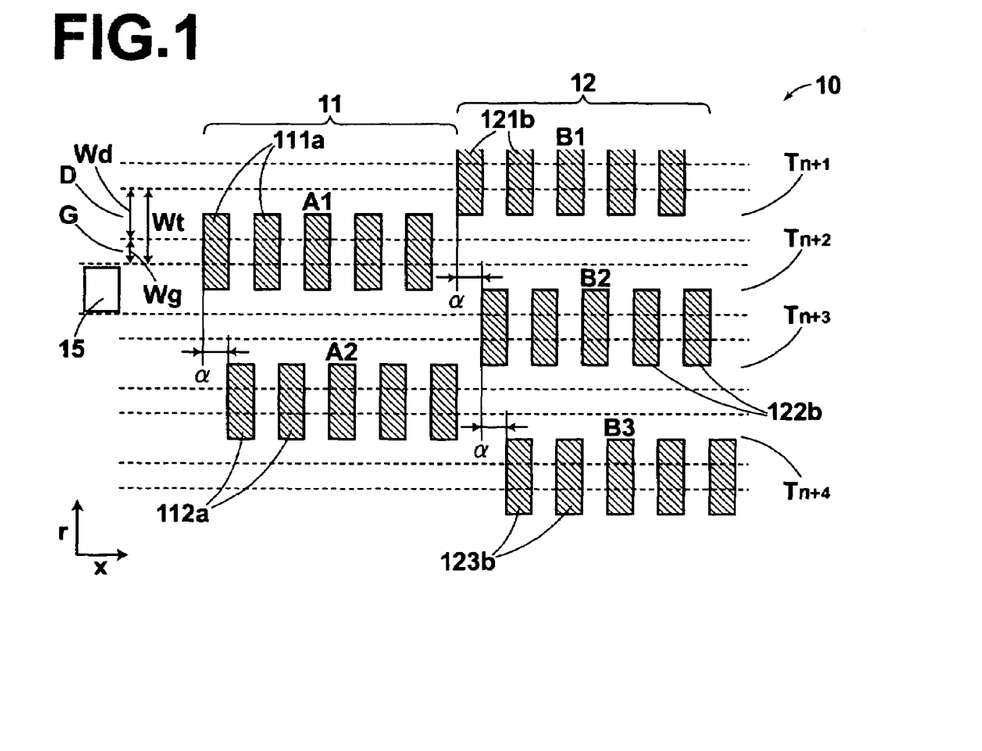
FIG. 1 is a partial enlarged view of an amplitude servo pattern according to an embodiment of the present invention.

FIG. 1 is an enlarged view of an amplitude servo pattern according to an embodiment of the present invention, illustrating a part of the pattern. FIG. 1 also serves as an enlarged view of a recording/reproducing layer of a magnetic recording medium of the present invention on which an amplitude servo pattern is ideally recorded, illustrating a part of the magnetized pattern of the servo signal.

An amplitude servo pattern 10 is recorded on the recording/reproducing layer of a magnetic recording medium. The magnetic recording medium is a disk shaped magnetic recording medium, such as a high density flexible disk, hard disk, or the like, having a recording/reproducing layer of a magnetic material formed on either or both sides of a base. Preferably, a thin magnetic coating layer or a thin metallic magnetic layer is used as the recording/reproducing layer in order to realize a high density medium. The base may be either flexible or nonflexible.

The recording/reproducing layer of the magnetic recording medium has concentric or helical tracks Tn formed thereon, and the amplitude servo pattern 10 carrying servo signals of the present invention in the form of a magnetic pattern is recorded on the tracks Tn. The amplitude servo pattern 10, that is, servo signal is recorded within the servo fields formed on elongated areas that extend radially from the center with substantially equal spacing and is used as the tracking servo signal for the head during reproducing. The amplitude servo pattern 10 in the form of magnetic pattern may be visualized by the magnetic developing technique or the like for verification.

As shown in FIG. 1, each of the tracks Tn, on which the amplitude servo pattern 10 is recorded, has a data track D and guard band G formed contiguously in a track width direction r. The width Wt, which is the sum of the width Wd of the data track D and Wg of the guard band, corresponds to what is called the track pitch. Here, the track pitch is preferable to be less than approximately 200 nm. A reproducing head 15 is indicated schematically in the drawing for reference. The reproducing head 15 is positioned to move over the data tracks by a servo. Generally, the width of the reproducing head 15 in a track width direction is shorter than the width Wd of the data track. In the drawing, an arrow x indicates a track direction, and an arrow r indicates a track width direction, which corresponds to the diameter direction of the magnetic disk medium.

The amplitude servo pattern 10 comprises tracking servo signals composed of A, B, C and D bursts arranged in the track direction in this order, which provides reproduced amplitude servo signals for position control. FIG. 1 shows only A burst composed of A burst bit string 11, and B burst composed of B burst string 12 recorded on the portion of 4 tracks Tn+1 to Tn+4. A burst bit string 11 is composed of a plurality of rectangular burst bits 111a and 112a, and B burst bit string 12 is composed of a plurality of rectangular burst bits 121b, 122b and 123b. In the magnetized pattern, the shaded areas are burst bit recording areas, and the shaded and plain areas are magnetized in the opposite directions. The ratio of the length of the shaded area in the track direction and the length between the shaded areas in the track direction is 1 to 1. One shaded area or plain area corresponds to 1 bit, that is, 2 bits are present in the phase of 360 degrees.

The recording areas of A burst bit string and B burst bit string on the servo pattern 10 extend from the approximate center of the data track D to the approximate center of the adjacent data track in the width direction, and A burst bit string 11 and B burst bit string 12 are disposed alternately in the track width direction r. C burst bit string and D burst bit string respectively forming C burst and D burst (not shown) comprise similar burst bits to those of A and B burst bit strings. The recording areas of either C or D burst bit string are provided on odd number tracks with a length of approximately 1 track pitch Wt centered on the approximate width center of the data track D, and the other on even number tracks in the identical manner.

The recording areas of a plurality of burst bits forming each burst bit string on the amplitude servo pattern 10 (e.g. a plurality of burst bits 111a, 111a, - - - (5 burst bits in FIG. 1) forming A1 burst bit string extending over tracks Tn+1 and Tn+2) have the same length in the track width direction r, and the edge positions of the recording areas in the track width direction r are aligned with each other.

In FIG. 1, A1 and B2 burst bit strings are used for positioning the head 15 onto the second track Tn+2. A1 burst bit string extends over the first track Tn+1 and second track Tn+2, and B2 burst bit string extends over the second track Tn+2 and third track Tn+3. A1 burst bit string recorded over the first track Tn+1 and second track Tn+2 is also used for positioning the head 15 onto the first track Tn+1, while B2 burst bit string recorded over the second track Tn+2 and third track Tn+3 is also used for positioning the head 15 onto the third track Tn+3.

A tracking servo is applied to the head 15 traveling along the second track Tn+2 such that the amplitude reproduced by the A1 and B2 burst bit strings becomes equal to each other, and the head 15 is accurately positioned onto the second track Tn+2.

In the amplitude servo pattern 10, A1 burst bit string recorded over the first track Tn+1 and second track Tn+2, and A2 burst bit string recorded over the third track Tn+3 and fourth track Tn+4 are recorded adjacently with each other in the track width direction r with spacing (non-signal region) of approximately 1 track pitch Wt. In addition, they are disposed such that they have different phases in the track direction x (rotational direction of the magnetic disk). In the example shown in the drawing, they are disposed such that they have a phase difference a that corresponds to the width of a single burst bit in the x direction. Likewise, in the B burst bit string, adjacent burst bit strings B1 and B2, or B2 and B3 having spacing that corresponds to 1 track pitch Wt are disposed such that corresponding bits in the respective strings have the phase difference $\alpha$ with each other.

Figure 4:
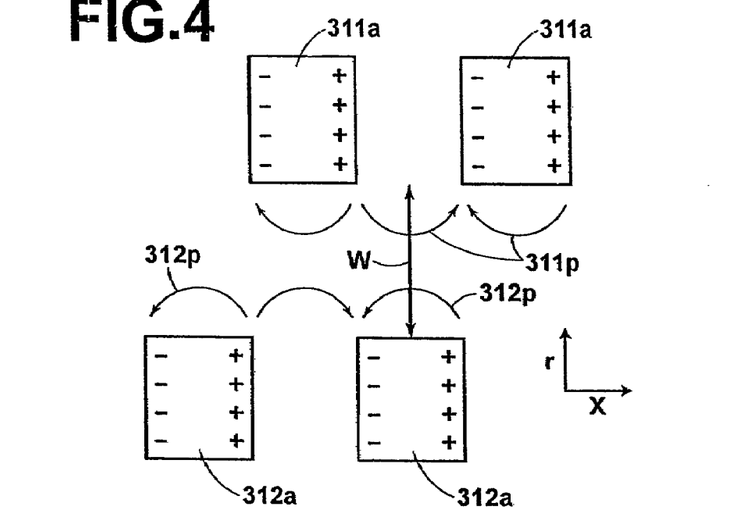
FIG. 4 is an explanatory diagram illustrating characteristics of the servo pattern on the patterned master substrate of the present invention when a magnetic field is applied thereto.

According to the amplitude servo patter 10, burst bit strings disposed adjacently in the track width direction r in each of the burst bit strings A, B, C and D, (for example, A1 and A2 burst bit strings in A burst bit string) have different phases with each other as described above. When a magnetic field for magnetic transfer is applied to a patterned master substrate 3 to be described later (FIG. 2) with burst bit elements 311a, 311a, and 312a, 312a formed to conform to the servo pattern 10, each burst bit element is magnetized such that edges of the element in the track direction r are positively and negatively polarized respectively as shown in FIG. 4 provided to make contrast with FIG. 5. Since, adjacent burst bit elements 311a, 311a and 312a, 312a in the track width direction r have different phases, magnetic field indicated by the arc shaped arrows 311p erupting from 311a, 311a and magnetic field indicated by the arc shaped arrows 312p erupting from 312a, 312a are cancelled out, and the magnetic field intensity range in the area indicated by the double head arrow W becomes like that as shown by the solid line 4 in FIG. 6, which is transferred to the magnetic recording medium. Thus, if the magnetic head scans the intermediate region between the burst bit string recorded on a magnetic medium corresponding to the burst bit elements 311a, 311a, and the burst bit string recorded on the magnetic medium corresponding to the burst bit elements 312a, 312a, no magnetic field is detected by the head as shown by the solid line 4 in FIG. 6. This allows accurate tracking of the magnetic head without detecting such noise as detected in the burst bit arrangement shown in FIG. 5.

The amount of phase shift $\alpha$ is provided so that edge positions of the burst bit elements in the track direction are displaced with each other, that is, the magnetic polarities developed thereon differs with each other. In the example shown in the drawing, the burst bit elements are disposed in the optimum condition, that is, phase difference of 180 degrees (i.e. displacement of 1 bit length) to have directly opposite polarities. A smaller amount of phase shifting, however, may also be effective, and more specifically, an amount of phase difference in the range from 90 to 180 degrees is effective.

Likewise, in C and D burst bit strings (not shown) of the amplitude servo pattern 10, adjacent burst bit strings having spacing corresponding to 1 track pitch Wt may be disposed to have a certain amount of phase difference, e.g., the amount of $\alpha$ described above depending on the phase difference in A and B burst bit strings 11 and 12.

Figure 2A:
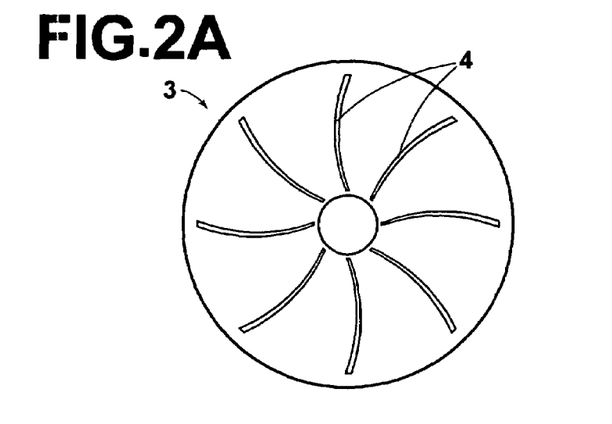
FIG. 2A is a top view of a patterned magnetic transfer master substrate.
Figure 2B:
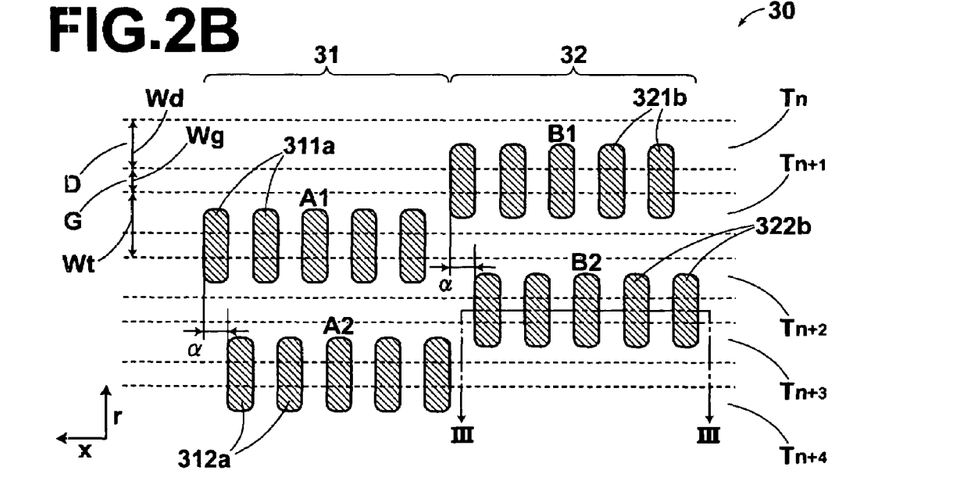
FIG. 2B is a partial enlarged top view of the patterned magnetic transfer master substrate.

Each bit (element) in the burst bit strings shown in FIG. 1 is rectangular, but a rounded bit at the edge portions in the track width direction (corners) like the one shown in FIG. 2B is more preferable, since less amount of magnetic field is erupted therefrom. Alternatively, it may be shaped like a parallelogram inclined relative to the track width direction r.

Further, like the shape of the bit element shown in FIG. 2B, each recording area in A and B burst bit strings may be formed such that the length in the track width direction is longer than the track pitch Wt, so that recording regions in A and B burst bit strings overlap with each other at the width center of the data track D when viewed from the track direction x.

In this case, each burst bit element is recorded in the area beyond the center of the data track D in the track width direction, so that a signal having greater amplitude may be reproduced compared with the case in which the length of the burst bit in the track width direction is substantially equal to the track pitch Wt.

Here, the ratio of the length in the track width direction r to the track direction x (aspect ratio) of each bit (element) in the burst bit strings is not greater than 2. For amplitude servo pattern, a servo field 4 shown in FIG. 2A differs in the length of servo burst signal in the track direction between the inner and outer circumferences, that is, it is longer on the outer circumference and shorter on the inner circumference. Consequently, the aspect ratio becomes smaller (not greater than 2) on the outer circumference than on the inner circumference. The magnetic field erupted from the burst bit element (311p or 312p in FIG. 4) having a smaller aspect ratio forms a larger arc, causing larger amount of noise by that much. Therefore, noise reduction effect obtainable by the phase shift becomes significant in the region where burst bit elements having aspect ratios not greater than 2 are formed, thereby a clear reproduced signal may be detected and the servo function is secured.

A magnetic recording/reproducing apparatus that uses a magnetic recording medium having the servo pattern of the present invention recorded thereon comprises: a magnetic head; a preformatted magnetic recording medium disposed opposite to the magnetic head; a means for driving the magnetic head; a means for driving the magnetic medium; and a recording/reproduced signal processing means for processing signals before sending to or after receiving from the magnetic head. The preformat of the magnetic medium includes an amplitude servo pattern having servo burst signals composed of burst bit strings adjacently disposed in the track width direction, and the servo burst signals have different phases with each other in the track direction. This arrangement may provide reproduced signals of greater amplitude and less noise; thereby a highly accurate tracking servo may be realized.

Preferably, the amplitude servo pattern 10 described above is recorded on a magnetic recording medium through magnetic transfer, taking into account the arbitrariness in the shape of the bust bit and the like.

Hereinafter, a manufacturing method for manufacturing a magnetic recording medium, in which the amplitude servo pattern 10 is recorded on the magnetic medium through magnetic transfer, will be described with reference to FIGS. 2A, 2B, 2C, 3A, 3B and 3C. In brief, the magnetic recording medium is produced through the following steps. First, the surface of the patterned master substrate 3 and a magnetic recording layer 2a of a magnetic recording medium 2 are placed together in close contact with each other. The patterned magnetic transfer master substrate 3 has thereon an amplitude servo transfer pattern 30 that comprises servo burst signals adjacently disposed on different tracks such that they have different phases with each other as described above. Then, a magnetic field is applied to the closely contacted patterned master substrate 3 and the magnetic recording medium 2 to transfer the magnetized pattern corresponding to the amplitude servo transfer pattern 30 to the recording layer 2a of the magnetic recording medium 2.

Figure 2C:
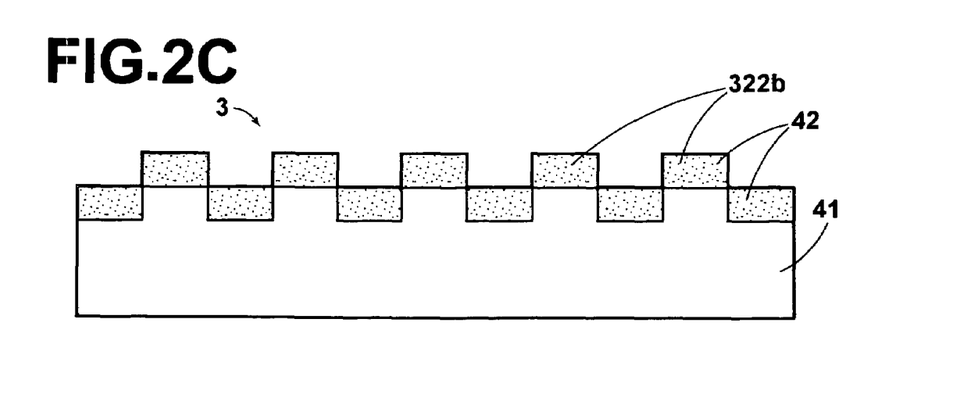
FIG. 2C is a partial cross-sectional view of the patterned magnetic transfer master substrate.

The patterned master substrate 3 used for the magnetic transfer is shown in FIGS. 2A, 2B and 2C. FIG. 2A is a top view, FIG. 2B is a partial enlarged top view, and FIG. 2C is a cross-sectional view taken along the line III-III in FIG. 2B.

As shown in FIG. 2A, the patterned master substrate 3 is shaped like a disk and servo fields 4 are formed on elongated areas extending radially from the center at substantially equal spacing. A servo pattern to be recorded, i.e. the servo transfer pattern 30 composed of an irregular pattern that corresponds to the servo signals as shown in FIG. 2B is formed on the servo fields 4 of the master substrate 3.

FIG. 2B is a partial enlarged view of A element string 31 and B element string 32 within the servo field 4 corresponding respectively to A and B burst bit strings, which correspond to those shown in FIG. 1. The master substrate has a track that corresponds to that on a magnetic recording medium and an irregular pattern is formed along the track. In FIG. 2B, tracks, data tracks, guard bands and respective widths corresponding to the tracks, data track D, guard band G and respective widths in FIG. 1 are given the same reference marks.

In FIG. 2B, the shape of the shaded areas differs from that shown in FIG. 1. These areas are the surfaces of burst bit elements 311a, 312a, which respectively correspond to burst bit elements 111a, 121a forming A1 and A2 burst bit strings, and burst bit elements 321b, 322b, which respectively correspond to burst bit elements 121b, 122b forming B1 and B2 burst bit strings. A1 burst bit string extends over the first track Tn+1 and second track Tn+2, and B2 burst bit string extends over the second track Tn+2 and third track Tn+3. Five burst bit elements 311a comprising A1 burst bit string (also five burst bit elements in A2, B1 and B2 burst bit strings) are formed such that the surface length of each of the five burst bit elements 311a in the track width direction r is longer than the track pitch Wt, and the bottom edge of the element 311a overlaps with the upper edge of the element 322b in the track width direction at the center of the second track Tn+2 in the track width direction. In addition, these edges are rounded.

Further, in the amplitude servo transfer pattern 30, A1 burst bit string recorded over the first track Tn+1 and second track Tn+2, and A2 burst bit string recorded over the third track Tn+3 and fourth track Tn+4 are recorded adjacently with each other in the track width direction r with spacing of approximately 1 track pitch Wt. In addition, they are disposed such that they have different phases with each other in the track direction x. In the example shown in the drawing, they are disposed such that they have a phase difference $\alpha$ that corresponds to the width of a single burst bit. Likewise, in the B1 and B2 burst bit strings, adjacent burst bits 321b and 322b having spacing corresponding to 1 track pitch Wt are disposed such that they have a phase difference $\alpha$ with each other.

As shown in FIG. 2C, which is a partial cross-sectional view, the patterned master substrate 3 has a base plate 41 having an irregular pattern on the surface; and a magnetic layer 42 formed on the base plate 41. In the present embodiment, a protruding portion 322b of the magnetic layer 42 constitutes each element of the B burst bit string (same applies to A burst bit element 311a).

Preferably, the base plate 41 is made of Ni, silicon, quartz plate, glass, aluminum, ceramics, synthetic resin, or the like, in particular, Ni or Ni based alloy.

As for the magnetic materials for the magnetic layer 42, the following may be used; namely, Co, Co alloys (CoNi, CoNiZr, CoNbTaZr, and the like), Fe, Fe alloys (FeCo, FeCoNi, FeNiMo, FeAlSi, FeAl, FeTaN), Ni, or Ni alloy (NiFe). Particularly, FeCo (Fe70Co30 in particular) and FeCoNi are preferable. Use of magnetic layer having a small coercive force, such as a soft magnetism, semi-hard magnetism, or the like, for the magnetic layer 42 formed on the base plate 41 may result in a more satisfactory magnetic transfer. Preferably, the magnetic layer has a higher saturated magnetism than that of the base plate.

The base plate having a patterned surface may be produced by sputtering, photolithography, or the like. In an example process for producing the patterned master substrate 3, a first original master having a patterned surface that corresponds to the signal pattern (including a reversed pattern reversed in the protruding and recessed portions) is produced. Then, a metal plate having a patterned surface is produced by electroforming using the first original master.

The first original master having a patterned surface may be produced using photolithography or the like. Hereinafter, a method for producing the original master using a silicon wafer will be described. But a quartz or glass plate may also be used for producing the original master instead of a silicon wafer.

First, a positive electroresist layer is formed on a disk-shaped silicon wafer having a flat surface by spin coating or the like. Then, an electron beam modulated in accordance with the signal pattern described above is irradiated on the resist layer with the wafer being rotated so that the entire surface of the resist layer is exposed in the form of the signal pattern. For example, if the signal pattern is servo signals used for a magnetic disk, a pattern corresponding to the servo signals extending in the circumferential direction is irradiated on a portion of each of a plurality of sectors (e.g. 200) provided at regular intervals on each of multitudes of tracks (e.g. several tens of thousands) formed concentrically at regular intervals. After the entire surface of the resist layer is pattern-exposed in this way, the resist layer is processed to remove the portions exposed by the electron beam from the silicon wafer. In this way, a silicon wafer having a patterned surface, that is, the first original master is produced, in which portions with the remaining resist layer constitute the protruding portions, and portions from which the resist coat is removed and the surface of the silicon wafer is exposed constitute the recessed portions of the irregular pattern.

Then, the first original master produced in this manner is used for electroforming. That is, after a thin conductive layer is formed on the surface of the irregular pattern of the first original master as required through sputtering, deposition or electroless plating of a metal, such as nickel or silver, Ni is electroplated on the irregular pattern such that the thickness of the electroplated Ni is substantially greater than the height of the protruding portion. Thereafter, the electroplated Ni is separated from the first original master. In this way, a Ni plate having an irregular pattern, in which portions exposed by the electron beam constitute the protruding portions, is obtained (hereinafter, "first mold"). The first mold obtained in this way is used as a patterned master substrate as is without any further processing or after applying a soft magnetic layer and protective layer in this order on the patterned surface.

It is also possible to produce another Ni plate having a patterned surface (hereinafter, "second mold") through electroforming using the first mold as the second original master, which may be used as a patterned master substrate as is without any further processing or after applying a soft magnetic layer and protective layer in this order on the patterned surface. Preferably, the first original master is produced by using a negative electroresist and irradiating the electron beam in a signal pattern that corresponds to the servo signals, or using a positive electroresist and irradiating the electron beam in a reverse signal pattern of the servo signals. This embodiment has an advantage that a plurality of patterned master substrates is produced from the second original master.

Further, a disk made of resin having a patterned surface may be formed by a stamping method using the second original master as the stamper, which may be used as a master substrate after applying a soft magnetic layer and a protective layer in this order on the patterned surface.

In the mean time, after the first original master is produced in the manner described above, if an etching process is performed on the surface of the master, the resist constituting the protruding portions serves as the etching resist, so that surface portions of the silicon wafer corresponding to the recessed portions may be etched selectively. If the resist constituting the protruding portions is removed after the etching process is performed, a silicon wafer having an irregular pattern on its own surface may be obtained as the third original master. By performing electroforming in the same manner as described above using the third original master, a Ni plate having a patterned surface ("third mold") may be produced. The third mold produced in this manner may be used as a master substrate as is without any further processing or after applying a soft magnetic layer and a protective layer in this order on the patterned surface. This embodiment also allows a plurality of patterned master substrates to be produced from the third original master.

Preferably, the height of the protruding portions (depth of the irregular pattern) of the master substrate 3 is in the range from 20 to 500 nm, and more preferably in the range from 40 to 100 nm. If the irregular pattern comprises sample servo signals, a rectangular protruding portion which is longer in the radius direction than in the circumferential direction, i.e. the track direction is formed.

The soft magnetic layer is applied on the irregular pattern of the base plate using a vacuum coating technique, such as vacuum evaporation, sputtering or ion plating, or a plating technique, such as electroplating or electrolessplating. Preferably, the thickness of the soft magnetic layer (on the protruding portion) is in the range from 20 to 500 nm, and more preferably in the range from 30 to 100 nm.

Preferably, a protective layer made of carbon or diamond-like carbon (DLC) is applied on the magnetic layer 42 provided on the protruding portions with a thickness of 3 to 30 nm. In addition, a lubricant layer may further be provided on the protective layer. Further, a contact enhancing layer made of Si or the like may be provided between the soft magnetic layer and protective layer. The lubricant agent may prevent abrasion due to friction when misalignment that may arise in the process of making contact with a magnetic recording medium is corrected and improve durability.

The arrangement of the patterned master 3 for magnetic transfer is not limited to those of the master substrate according to the embodiments described above. Any substrate that basically has servo signals in the form of an irregular pattern may be used. For example, it may be a base plate having a patterned surface made only of a magnetic material, a substrate made of a base plate having a patterned surface and a magnetic layer applied at least on the surface of the protruding portions, a substrate made of a nonmagnetic base plate having a patterned surface and a magnetic layer embedded in the recessed portions, a substrate made of a flat base plate and a magnetic layer having a patterned surface formed on the flat plate, or the like. In the case of the patterned master comprising a nonmagnetic base plate having a patterned surface and a magnetic layer embedded in the recessed portions, the bit element described above is composed of the magnetic layer embedded in the recessed portion.

Hereinafter, a magnetic transfer method for transferring a magnetized pattern to the magnetic disk recording medium 2 through magnetic transfer will be described with reference to FIGS. 3A, 3B and 3C.

Figure 3A:
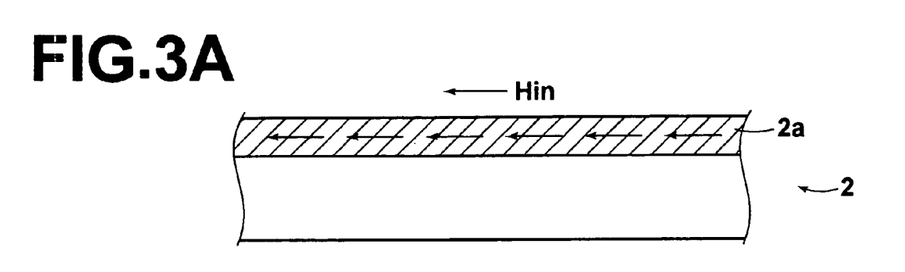
FIG. 3A is a drawing illustrating a basic process step of the magnetic transfer.
Figure 3B:
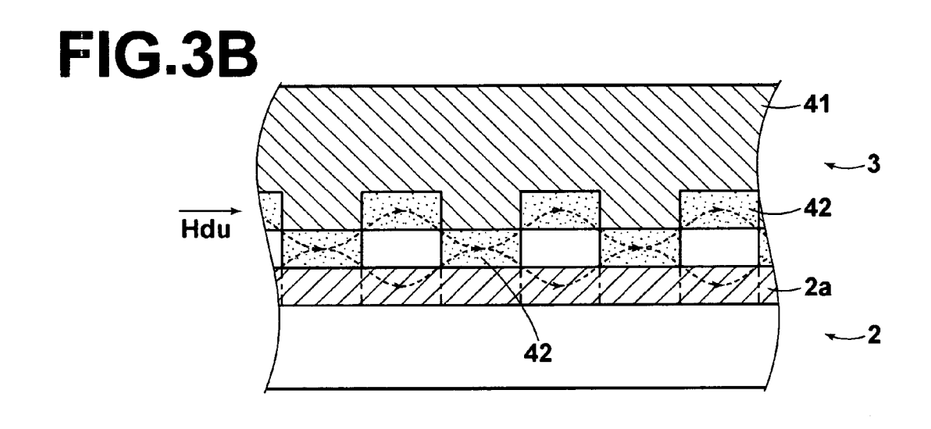
FIG. 3B is a drawing illustrating a basic process step of the magnetic transfer.
Figure 3C:
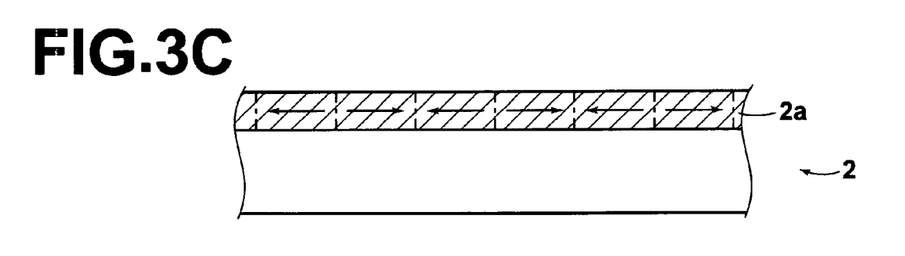
FIG. 3C is a drawing illustrating a basic process step of the magnetic transfer.

FIGS. 3A, 3B and 3C are drawings for describing the basic process steps of the magnetic transfer. FIG. 3A shows a process step in which a magnetic field is applied in one direction to give an initial DC magnetization to the magnetic recording medium. FIG. 3B shows a process step in which a magnetic field is applied to the master substrate and magnetic recording medium, which have been placed together in close contact with each other, in the direction opposite to the direction of the initial magnetization. FIG. 3C shows the magnetic recording medium after the magnetic transfer has been performed.

As shown in FIG. 3A, an initial magnetic field Hin has been applied to the magnetic recording medium 2 in advance in one of the track directions to initially magnetize the magnetic recording layer 2a in that direction. Thereafter, as shown in FIG. 3B, the recording surface of the magnetic recording medium 2 and the transfer pattern surface of the master substrate 3 are placed together in close contact with each other, and a transferring magnetic field Hdu is applied in one of the track directions of the magnetic recording medium 2 which is opposite to the direction of the initial magnetic field Hin. At the place where the recording surface of the magnetic recording medium 2 and the protruding portion of the transfer pattern of the master substrate 3 is in close contact with each other, the magnetic field Hdu is drawn into the magnetic layer 42 of the protruding portion of the master substrate 3, so that magnetization of the section on the magnetic recording layer 2a of the magnetic recording medium 2 corresponding to that place is not reversed. But the magnetization of the section on the magnetic recording layer 2a corresponding to the recessed portion of the master substrate 3 is reversed by the magnetic field leaked from the protruding portion of the master substrate 3. As a result, a magnetized pattern corresponding to the irregular pattern on the surface of the master substrate 3 is magnetically transferred to the magnetic recording layer 2a of the magnetic recording medium 2 as shown in FIG. 3C.

The intensity of the initial and transferring magnetic fields to be applied needs to be determined by taking into account the coercive force of the magnetic layer of the magnetic recording medium, and relative magnetic permeability of the magnetic layer of the master substrate and magnetic recording medium.

It has been difficult to record a bit having rounded edges as in the servo transfer pattern 30 shown in FIG. 2B by the conventional servo track writer. But it is readily provided by the use of magnetic transfer as in the present embodiment. Further, the amplitude servo magnetized pattern 10 shown in FIG. 1 may be recorded more accurately in a shorter time through the magnetic transfer method compared with the servo track writer.

Preferably, each of the burst bit elements to be formed on the master substrate 3 has rounded surface edges in the track width direction as shown in FIG. 2B when a servo pattern is transferred and recorded on the magnetic recording medium 2 from the master substrate 3 through magnetic transfer. In view of the nature of the master substrate produced by a stamper method or the like, when tracing the shape of these bit elements with a laser beam, electron beam or the like, more uniformly shaped bit elements with less variation in the shape of the edges may readily be formed if the edges are rounded. Further, the bit elements with rounded surface edges is superior to those with a rectangular surface for magnetic transfer due to magnetic saturation property, thereby a magnetized pattern may be formed satisfactorily on the magnetic recording medium.

Hereinafter, verification test results of noise reduction effect obtained by the phase shifting between the burst bit strings described above will be described. The test method was to measure a reproduced signal from the non-signal region between the burst bit strings having different phases or the same phase for comparison. Two sample pairs of patterned master substrates were produced, each by applying a magnetic layer of Fe70Co30 at a thickness of 80 nm on a patterned surface formed on a surface of a base plate having an irregular pattern having the depth of 100 nm.

The first sample pair comprises master substrates having bit elements of 150 nm long in the track width direction and 70 nm long in the track direction (aspect ratio: 2.14), and one of which have the adjacent bit strings having phase difference of 180 degrees with each other (difference of 1 bit) and the other has the adjacent bit strings having the same phase. The second sample pair comprises master substrates having bit elements of 150 nm long in the track width direction and 140 nm long in the track direction (aspect ratio: 1.07), and one of which have the adjacent bit strings having phase difference of 180 degrees with each other (difference of 1 bit) and the other has the adjacent bit strings having the same phase.

A magnetic recording medium having a magnetic pattern transferred from the master substrate having the same phase was scanned by a magnetic head to measure a reproduced signal from the non-signal region. Then, a magnetic recording medium having a magnetic pattern transferred from the master substrate having the phase difference of 180 degrees was scanned by the magnetic head to measure a reproduced signal from the non-signal region, and the two measurements were compared. In the first sample pair, the latter was 2 dB lower than the former, while in the second sample pair, the latter was 3 dB lower than the former. Thus, the test result shows that more significant noise reduction effect is obtained in the regions of a smaller aspect ratio, indicating that the phase shifting in these regions is effective for noise reduction.

What is claimed is:

1. A magnetic recording medium having an amplitude servo pattern recorded on the magnetic recording layer of the medium through magnetic transfer,
    wherein the amplitude servo pattern has servo burst signals composed of burst bit strings adjacently disposed in a track width direction, and the servo burst signals adjacently disposed in the track width direction have different phases with each other in a track direction;
    wherein the ratio of the length in the track width direction to the track direction of each bit in the burst bit strings is not greater than 2; and
    wherein the length of the bit in the track width direction is longer than the track pitch.

2. The magnetic recording medium according to claim 1, wherein the servo burst signals adjacently disposed in the track width direction have a phase difference in the range from 90 to 180 degrees.

3. The magnetic recording medium according to claim 1, wherein each of the servo burst signals has rounded edges in the track width direction.

4. The magnetic recording medium according to claim 1, wherein the track pitch is less than 200 nm.

5. The magnetic recording medium according to claim 1, wherein the servo burst signal is inclined relative to the track width direction.

6. The magnetic recording medium according to claim 1, wherein the servo burst signal has a parallelogram shape.

7. The magnetic recording medium according to claim 6, wherein the parallelogram shape is inclined relative to the track width direction.

8. A manufacturing method for manufacturing a preformatted magnetic recording medium, comprising the steps of:
    placing the surface of a patterned magnetic transfer master substrate and a magnetic recording surface of a magnetic recording medium together in close contact with each other, the master substrate having thereon an amplitude servo transfer pattern that comprises servo burst signals composed of burst bit element strings adjacently disposed in a track width direction, and the servo burst signals adjacently disposed in the track width direction having different phases with each other in a track direction, wherein the ratio of the length in the track width direction to the track direction of each bit in the burst bit element strings is not greater than 2 and wherein the length of the bit in the track width direction is longer than the track pitch; and
    applying a magnetic field to the closely contacted patterned magnetic transfer master substrate and magnetic recording medium to magnetically transfer the amplitude servo transfer pattern to the recording surface of the magnetic recording medium.

9. A patterned magnetic transfer master substrate having thereon an amplitude servo transfer pattern that comprises servo burst signals composed of burst bit strings adjacently disposed in a track width direction, the servo burst signals adjacently disposed in the track width direction having different phases with each other in a track direction, wherein the ratio of the length in the track width direction to the track direction of each bit in the burst bit strings is not greater than 2 and wherein the length of the bit in the track width direction is longer than the track pitch.

10. The patterned magnetic transfer master substrate according to claim 9, wherein the servo burst signals adjacently disposed in the track width direction have a phase difference in the range from 90 to 180 degrees.

11. The patterned magnetic transfer master substrate according to claim 9,
wherein each of the servo burst signals has rounded edges in the track width direction.

12. A magnetic recording/reproducing apparatus, comprising:
a magnetic head;
a preformatted magnetic recording medium disposed opposite to the magnetic head;
a means for driving the magnetic head;
a means for driving the magnetic medium; and
a recording/reproduced signal processing means for processing signals before sending to or after receiving from the magnetic head,
wherein the preformat of the magnetic medium includes an amplitude servo pattern that comprises servo burst signals composed of burst bit strings adjacently disposed in a track width direction, the servo burst signals adjacently disposed in the track width direction having different phases with each other in a track direction, wherein the ratio of the length in the track width direction to the track direction of each bit in the burst bit strings is not greater than 2 and wherein the length of the bit in the track width direction is longer than the track pitch.

* * * * *